United States Patent
Liang et al.

(10) Patent No.: US 10,289,710 B2
(45) Date of Patent: May 14, 2019

(54) METHOD FOR MODIFYING ROOT NODE, AND MODIFICATION APPARATUS

(71) Applicant: HUAWEI TECHNOLOGIES CO., LTD., Shenzhen, Guangdong (CN)

(72) Inventors: Yuansheng Liang, Shenzhen (CN); Li Yao, Shenzhen (CN); Jixuan Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 505 days.

(21) Appl. No.: 15/198,273

(22) Filed: Jun. 30, 2016

(65) Prior Publication Data
US 2016/0314159 A1   Oct. 27, 2016

Related U.S. Application Data

(63) Continuation of application No. PCT/CN2013/091141, filed on Dec. 31, 2013.

(51) Int. Cl.
*G06F 17/30* (2006.01)

(52) U.S. Cl.
CPC .. *G06F 17/30345* (2013.01); *G06F 17/30289* (2013.01); *G06F 17/30327* (2013.01); *G06F 17/30557* (2013.01); *G06F 17/30575* (2013.01)

(58) Field of Classification Search
CPC ......... G06F 17/30327; G06F 17/30345; G06F 17/30575
See application file for complete search history.

(56) References Cited

U.S. PATENT DOCUMENTS

| 4,914,569 A | 4/1990 | Levine et al. |
| 6,606,626 B1 | 8/2003 | Ponnekanti |

(Continued)

FOREIGN PATENT DOCUMENTS

| CN | 101246500 A | 8/2008 |
| CN | 103198122 A | 7/2013 |

(Continued)

OTHER PUBLICATIONS

XP58134953A, Ohad Rodeh et al. B-trees, Shadowing, and Clones, ACM Transactions on Storage, Association for Computing Machinery, New York, NY, US, vol. 3, No. 4, Feb. 25, 2008. total 28 pages.

*Primary Examiner* — Kris E Mackes
(74) *Attorney, Agent, or Firm* — James Anderson Harrison

(57) ABSTRACT

Embodiments of the present invention provide a method for modifying a root node, and a modification apparatus. The method for modifying a root node of the present invention includes: receiving a root node modification request; modifying a root node in a data area of a database according to the modification information; replicating the modified root node to the general area of the database; finding, in the general area of the database, that an identifier of an active mapping page is the identifier of the first mapping page, and determining that the first mapping page is the active mapping page; and replacing the second mapping page with the modified root node according to the modified root node that is replicated to the general area, and modifying the identifier of the active mapping page to the identifier of the second mapping page. The present invention improves concurrent processing efficiency of indexing.

14 Claims, 5 Drawing Sheets

(56) References Cited

U.S. PATENT DOCUMENTS

| | | |
|---|---|---|
| 6,792,432 B1 | 9/2004 | Kodavalla |
| 8,380,758 B1 | 2/2013 | Stephens |
| 2003/0204517 A1* | 10/2003 | Skinner .................. G06F 9/542 |
| 2006/0074977 A1 | 4/2006 | Kothuri et al. |
| 2006/0155915 A1* | 7/2006 | Pereira .................... H04L 45/00 <br> 711/100 |
| 2009/0287861 A1* | 11/2009 | Lipps ....................... G06F 13/28 <br> 710/28 |
| 2013/0010790 A1* | 1/2013 | Shao ........................ H04L 45/16 <br> 370/390 |
| 2013/0085997 A1 | 4/2013 | Kirihata et al. |
| 2013/0185271 A1 | 7/2013 | Strain et al. |
| 2013/0226966 A1* | 8/2013 | Shmueli ............ G06F 17/30545 <br> 707/770 |
| 2013/0339567 A1* | 12/2013 | Carpentier ......... G06F 11/0709 <br> 711/4 |

FOREIGN PATENT DOCUMENTS

| | | |
|---|---|---|
| CN | 103473239 A | 12/2013 |
| JP | H01116823 A | 5/1989 |
| JP | H04096837 A | 3/1992 |
| JP | 2013073557 A | 4/2013 |
| WO | 2012052785 A1 | 4/2012 |

* cited by examiner

METHOD FOR MODIFYING ROOT NODE, AND MODIFICATION APPARATUS

CROSS-REFERENCE TO RELATED APPLICATION

This application is a continuation of International Application PCT/CN2013/091141, filed on Dec. 31, 2013, which is hereby incorporated by reference in its entirety.

TECHNICAL FIELD

Embodiments of the present invention relate to database technologies, and in particular, to a method for modifying a root node, and a modification apparatus.

BACKGROUND

In the prior art, a data access speed of an in-memory database is generally improved by using an indexing technology. There are various types of indexes, for example, a multiway search tree (B*tree) index and a Hash index. In a B*tree, each node includes a quantity of keys included in this node, a pointer pointing to a parent node, a key, and a pointer, of the key, pointing to a child node. If the node has no parent node, in other words, the node is a root node, the node does not include a pointer pointing to a parent node; and if the node has no child node, that is, the node is a leaf node, the leaf node points to actual data to which a key of the leaf node points, and no key of a child node is greater than a key of a parent node to which a pointer of the child node points.

FIG. 1 shows a typical example of a B*tree. A node at a top layer is a root node and is a query entrance, and INF is the value of infinity. For example, if we need to search a query B*tree for a value with a key of 28, first, the root node is searched for a smallest key greater than or equal to 28, where the key is 56; then, a child node of the key 56 is found according to a pointer, of the key 56, pointing to the child node; then, the child node is searched for a smallest key greater than or equal to 28, where the key is 35; and a child node of the key 35 is subsequently found according to a pointer, of the key 35, pointing to the child node, so as to find, in the child node, a leaf node having a key of 28.

From the perspective of the foregoing process of searching the B*tree for a numeric value, when query is performed, the root node is searched first, and if a condition is met, a child node of a corresponding key is searched. Therefore, the root node inevitably becomes a hotspot. In a database, a write-once read-many concurrency mechanism is usually used, namely, a shared lock is added for read, and an exclusive lock is added for write. In this way, the root node may be read by many different transactions by adding a shared lock, and the root node may be written by only one transaction by adding an exclusive lock.

However, when the root node is written by only one transaction, no read operation of other transactions can be performed. In addition, because all query requests start from the root node, concurrent processing efficiency is very low.

SUMMARY

Embodiments of the present invention provide a method for modifying a root node, and a modification apparatus, so that a database can still process a modification request when handling a query request.

According to a first aspect, an embodiment of the present invention provides a modification apparatus, configured to modify a root node in a database and including:

a receiving module, configured to receive a root node modification request, where the root node modification request includes modification information, the database includes a data area and a general area, the data area includes the root node, the general area includes a first mapping page, an identifier of the first mapping page, a second mapping page, and an identifier of the second mapping page, and both the first mapping page and the second mapping page are mapping pages of the root node;

a modification module, configured to modify the root node in the data area of the database according to the modification information;

a replicating module, configured to replicate the modified root node to the general area of the database;

a determining module, configured to find, in the general area of the database, that an identifier of an active mapping page is the identifier of the first mapping page, and determine that the first mapping page is the active mapping page; and a replacing module, configured to replace the second mapping page with the modified root node according to the modified root node that is replicated to the general area, and modify the identifier of the active mapping page to the identifier of the second mapping page.

With reference to the first aspect, in a first possible implementation manner of the first aspect, the replacing module is further configured to: after the identifier of the active mapping page is modified to the identifier of the second mapping page and after a data query service currently handled by the first mapping page is completed, replace the current first mapping page with the modified root node.

With reference to the first aspect, in a second possible implementation manner of the first aspect, the foregoing modification apparatus further includes: a query module, configured to receive a data query request, find that the identifier of the active mapping page is the identifier of the second mapping page, and send the data query request to the second mapping page, so that the second mapping page handles the data query request.

With reference to the first aspect, in a third possible implementation manner of the first aspect, the foregoing modification apparatus further includes: a lock processing module, configured to: after the root node modification request is received, set an exclusive lock on the root node, and after the current second mapping page is replaced with the modified root node, remove the exclusive lock on the root node.

According to a second aspect, the present invention further provides a method for modifying a root node, including:

receiving a root node modification request, where the root node modification request includes modification information;

modifying a root node in a data area of a database according to the modification information, where the database includes the data area and a general area, the data area includes the root node, the general area includes a first mapping page, an identifier of the first mapping page, a second mapping page, and an identifier of the second mapping page, and both the first mapping page and the second mapping page are mapping pages of the root node;

replicating the modified root node to the general area of the database;

finding, in the general area of the database, that an identifier of an active mapping page is the identifier of the first mapping page, and determining that the first mapping page is the active mapping page; and replacing the second mapping page with the modified root node according to the modified root node that is replicated to the general area, and modifying the identifier of the active mapping page to the identifier of the second mapping page.

With reference to the second aspect, in a first possible implementation manner of the second aspect, after the identifier of the active mapping page is modified to the identifier of the second mapping page and after a data query service currently handled by the first mapping page is completed, the current first mapping page is replaced with the modified root node.

With reference to the second aspect, in a second possible implementation manner of the second aspect, the foregoing method further includes: receiving a data query request, finding that the identifier of the active mapping page is the identifier of the second mapping page, and sending the data query request to the second mapping page, so that the second mapping page handles the data query request.

With reference to the second aspect, in a third possible implementation manner of the second aspect, the foregoing method further includes: after the root node modification request is received, setting an exclusive lock on the root node; and after the current second mapping page is replaced with the modified root node, removing the exclusive lock on the root node.

According to a third aspect, the present invention further provides a non-volatile computer readable storage medium, where the non-volatile computer readable storage medium is configured to store computer executable program code, and the program code includes an instruction for executing the method according to any one of the second aspect and the first to third possible implementation manners of the second aspect.

According to a fourth aspect, the present invention further provides a computer program, where when being executed by a computer, code in the computer program is used to implement the method according to any one of the second aspect and the first to third possible implementation manners of the second aspect.

In the embodiments of the present invention, a first mapping page and a second mapping page that correspond to a root node are stored in a general area, where one of the mapping pages serves as an active mapping page and is used to handle a data access service. Therefore, after the root node is modified, it is unnecessary to add a lock on the root node, and access is still handled by using the active mapping page. In addition, a non-active mapping page is updated first, and then the non-active mapping page is switched to the active mapping page, so as to implement update of the active mapping page, thereby further implementing that a database can still handle a modification request when handling a query request and improving concurrent processing efficiency of the database.

BRIEF DESCRIPTION OF DRAWINGS

To describe the technical solutions in the embodiments of the present invention or in the prior art more clearly, the following briefly introduces the accompanying drawings may required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 2:
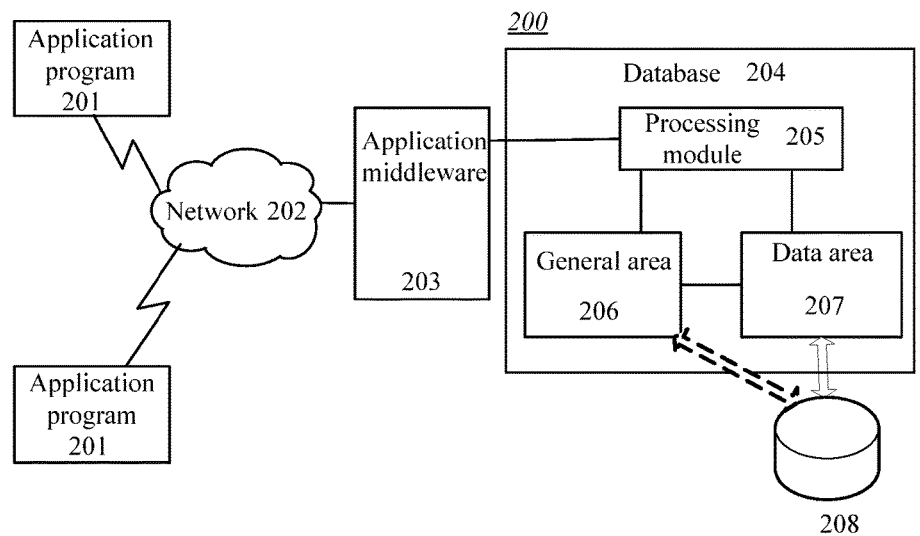
FIG. 2 is a schematic diagram of a network environment according to an embodiment of the present invention.

FIG. 2 is a schematic diagram of a network environment according to an embodiment of the present invention. An application program 201 refers to a computer program capable of providing various specific functions, and includes, but is not limited to, a charging application, an Internet browser, a multimedia player, and the like. The application program may access a database 204 by using a communications network 202, where the database 204 may be specifically an in-memory database. Multiple application programs may interact with a processing module 205 in the database 204 by using application middleware 203, so as to access or process data in a general area 206 or a data area 207. The database 204 includes the processing module 205, the general area 206, and the data area 207. The data area 207 stores specific data and a root node, such as a root node, child nodes, and specific data that are involved in the present application. The general area 206 stores temporary management data of the database, such as a first mapping page, a second mapping page, an identifier of the first mapping page, an identifier of the second mapping page, and an identifier of an active mapping page that are involved in the present patent, where both the first mapping page and the second mapping page are mapping pages of the root node; and within a same time, one of the first mapping page and the second mapping page is an active mapping page, and the other is a standby mapping page. Switching may be implemented between the active mapping page and the standby mapping page. The active mapping page is used to handle a data query service. Data included in the first mapping page and the second mapping page is the same as that included on the root node. Therefore, when the active mapping page handles a data query service, a query processing manner in the prior art is still used. If a mapping page is the active mapping page, the identifier of the active mapping page is an identifier of the mapping page. For example, if the first mapping page is the active mapping page, the current identifier of the active mapping page is the identifier of the first mapping page. The identifier of the first mapping page, the identifier of the second mapping page, and the identifier of the active mapping page may all be digits, letters, descriptions, or the like. For example, the identifier of the first mapping page is 1, the identifier of the second mapping page is 2, the identifier of the active mapping page is m, and when m equals 1, it indicates that the active mapping page is the first mapping page. Certainly, the active mapping page may also be described by using a text, for example, the identifier of the active mapping page is 1. Further, the in-memory database 204 is further connected to a storage engine 208. The storage engine 208 stores persistent data. The in-memory database 204 may store the persistent data in the data area 207 into the storage engine 208, and the in-memory database 204 may also acquire data from the storage engine 208. Further, the processing module 205 may be specifically configured to receive a root node modification request, where the root node modification request includes modification information; modify the root node in the data area of the database according to the modification information; replicate the modified root node to the general area of the database; find, in the general area of the database, that the identifier of the active mapping page is the identifier of the first mapping page, and determine that the first mapping page is the active mapping page; and replace the second mapping page with the modified root node, and modify the identifier of the active mapping page to the identifier of the second mapping page.

Figure 3:
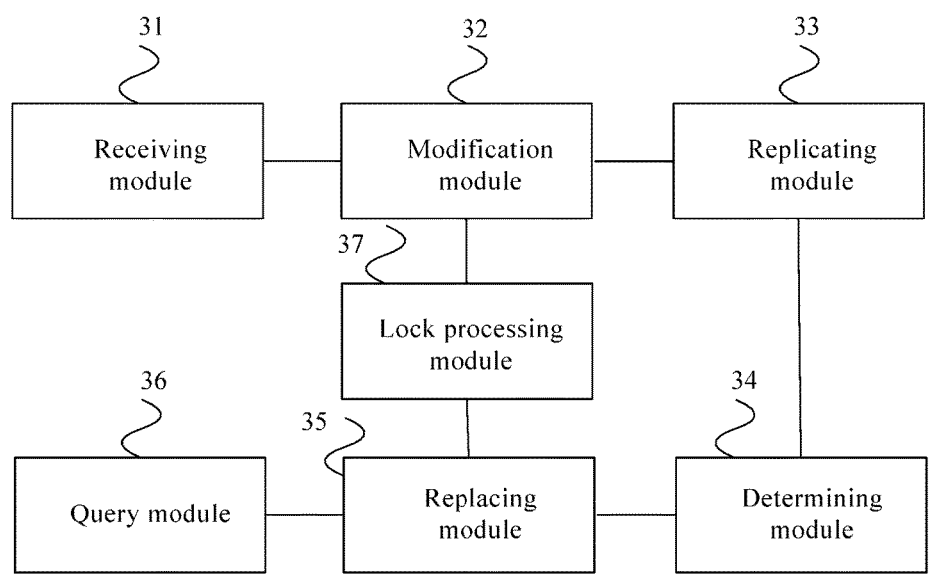
FIG. 3 is a schematic structural diagram of a modification apparatus according to an embodiment of the present invention.

As shown in FIG. 3, an embodiment of the present invention further provides a modification apparatus. The modification apparatus may be specifically located on the processing module 205 in the database shown in FIG. 2. The modification apparatus is configured to modify a root node in a database and includes:

a receiving module 31, configured to receive a root node modification request, where the root node modification request includes modification information, the database includes a data area and a general area, the data area includes the root node, the general area includes a first mapping page, an identifier of the first mapping page, a second mapping page, and an identifier of the second mapping page, and both the first mapping page and the second mapping page are mapping pages of the root node;

a modification module 32, configured to modify the root node in the data area of the database according to the modification information;

a replicating module 33, configured to replicate the modified root node to the general area of the database;

a determining module 34, configured to find, in the general area of the database, that an identifier of an active mapping page is the identifier of the first mapping page, and determine that the first mapping page is the active mapping page; and a replacing module 35, configured to replace the second mapping page with the modified root node, and modify the identifier of the active mapping page to the identifier of the second mapping page.

Further, the replacing module 35 is further configured to: after the identifier of the active mapping page is modified to the identifier of the second mapping page and after a data query service currently handled by the first mapping page is completed, replace the current first mapping page with the modified root node.

Further, the modification apparatus may further be configured to query data. Therefore, the modification apparatus further includes a query module 36, configured to receive a data query request, find that the identifier of the active mapping page is the identifier of the second mapping page, and send the data query request to the second mapping page, so that the second mapping page handles the data query request.

Further, the modification apparatus further includes a lock processing module 37, configured to: after the root node modification request is received, set an exclusive lock on the root node, so as to prevent another transaction from accessing or modifying the root node when the root node is being modified, thereby ensuring data consistency of the root node; and after the current second mapping page is replaced with the modified root node, remove the exclusive lock on the root node.

Figure 4:
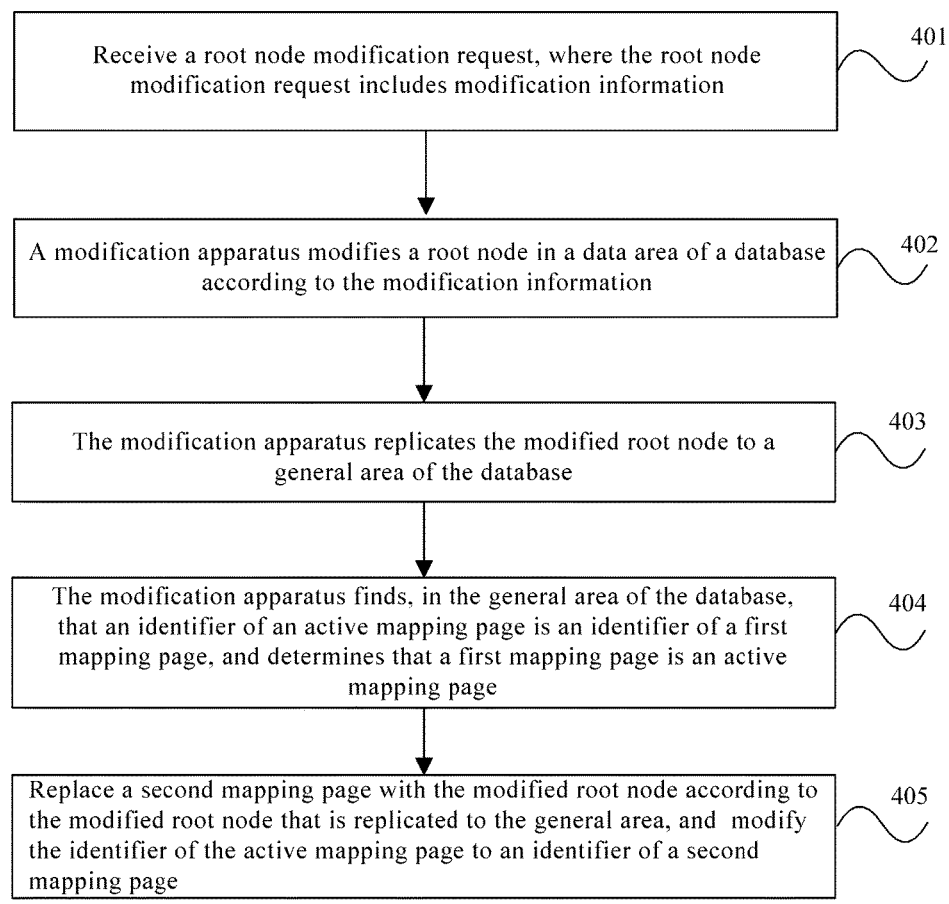
FIG. 4 is a flowchart of a method for modifying a root node according to an embodiment of the present invention.

Based on the network environment shown in FIG. 2, and based on the modification apparatus in FIG. 3, FIG. 4 is a flowchart of an embodiment of a method for modifying a root node according to the present invention, and the method includes:

Step 401: Receive a root node modification request, where the root node modification request includes modification information.

Specifically, an application program sends the root node modification request to a modification apparatus of a database, where the root node modification request includes the modification information, and the modification information may be a to-be-modified object and value of the root node.

Certainly, the application program may directly send the root node modification request to the modification apparatus, or send the root node modification request to the modification apparatus by using application middleware.

Step 402: A modification apparatus modifies a root node in a data area of a database according to the modification information.

When the modification apparatus needs to modify the root node, the modification apparatus needs to set an exclusive lock on the root node, but the exclusive lock does not affect data query, and only ensures that the root node is modified by only one thread at one moment. The database can still perform data query processing by using a mapping page corresponding to the root node.

Step 403: The modification apparatus replicates the modified root node to a general area of the database.

Step 404: The modification apparatus finds, in the general area of the database, that an identifier of an active mapping page is an identifier of a first mapping page, and determines that the first mapping page is the active mapping page.

Step 405: Replace a second mapping page with the modified root node, and modify the identifier of the active mapping page to an identifier of the second mapping page.

It has been determined in step 404 that the first mapping page is the active mapping page. Namely, the second mapping page is not the active mapping page. Therefore, the current second mapping page is replaced with the foregoing modified root node. In this way, content of the replaced second mapping page is the same as the content of the foregoing modified root node. Further, the replaced second mapping page may correspond to the modified root node in the data area. Therefore, the second mapping page becomes the active mapping page, and starts to handle a data query service. No matter whether the active mapping page is the first mapping page or the second mapping page, the active mapping page cannot be modified. Namely, the active mapping page is read-only. The active mapping page can be modified only after being switched to a standby mapping page.

When the identifier of the active mapping page is the identifier of the second mapping page, in other words, when the first mapping page is not the active mapping page and the first mapping page does not handle a data query service, after the data query service currently handled by the first mapping page is completed, the modification apparatus replaces the current first mapping page with the foregoing modified root node. In this way, content of the replaced first mapping page is completely the same as the foregoing modified root node, and the replaced first mapping page may correspond to the modified root node in the data area.

After the foregoing first mapping page and second mapping page are successfully updated, the modification apparatus removes the exclusive lock on the root node.

Figure 5:
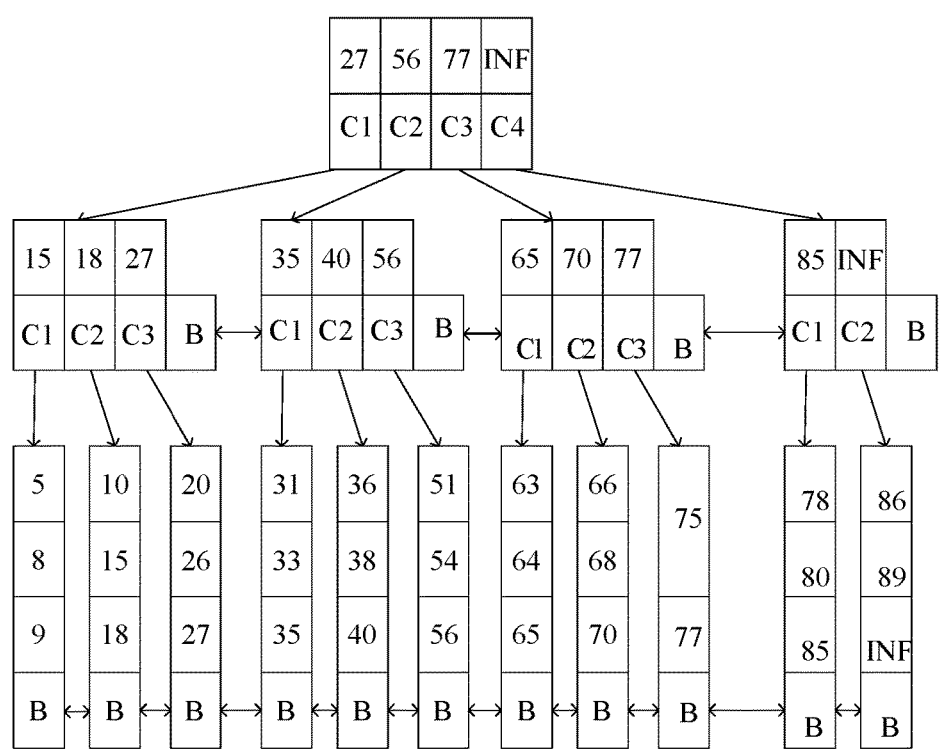
FIG. 5 is a schematic structural diagram obtained after modifying the B*tree based on FIG. 1.

Specifically, the foregoing method for modifying a root node is described below with reference to a specific example. A child node is newly added to a root node of the B*tree shown in FIG. 1. As shown in FIG. 5, a process of newly adding a child node is as follows:

When a node (for ease of description, the node is referred to as an original node hereinafter) is full, if a next brother node of the node is not full, a part of data is moved to the next brother node, and a key is inserted into the original node. Because a key range of the brother node is changed, a key of the brother node in a parent node is modified finally. If the next brother node is also full, a new node is added between the original node and the brother node, one third of data of both the original node and the brother node is replicated to the new node, and a pointer to the new node is added to the parent node finally.

Figure 1:
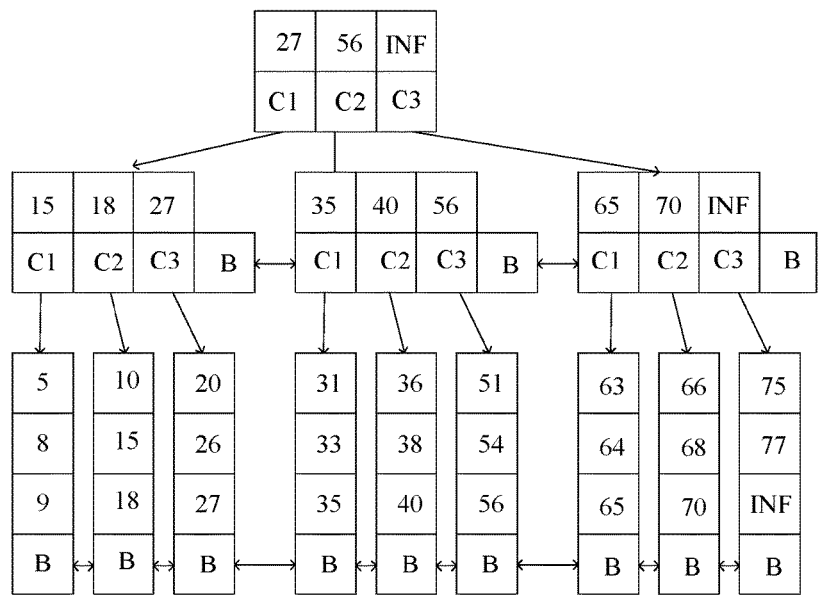
FIG. 1 is a schematic structural diagram of a B*tree in the prior art.

According to the foregoing process of newly adding a child node, based on the B*tree shown in FIG. 1, newly added keys include 78, 80, 85, 86, and 89, and a B*tree shown in FIG. 5 is obtained. Now a process of modifying the root node is introduced, and the process is as follows:

Because one child node of the root node is changed and one child node is added, it is to add a key 77 to the root node, where a pointer of the key points to a child node having keys of 65, 70, and 77, and a pointer of a key INF in the root node is modified to point to a child node having keys of 85 and INF. In this way, the root node is modified. After the root node is successfully modified, the first mapping page and the second mapping page in the general area are modified according to the foregoing process of steps 403 to 405.

In an embodiment of the present invention, a first mapping page and a second mapping page that correspond to a root node are stored in a general area, where one of the mapping pages serves as an active mapping page and is used to handle a data access service. Therefore, after the root node is modified, it is unnecessary to add a lock on the root node, and access is still handled by using the active mapping page. In addition, a non-active mapping page is updated first, and then the non-active mapping page is switched to the active mapping page, so as to implement update of the active mapping page.

Figure 6:
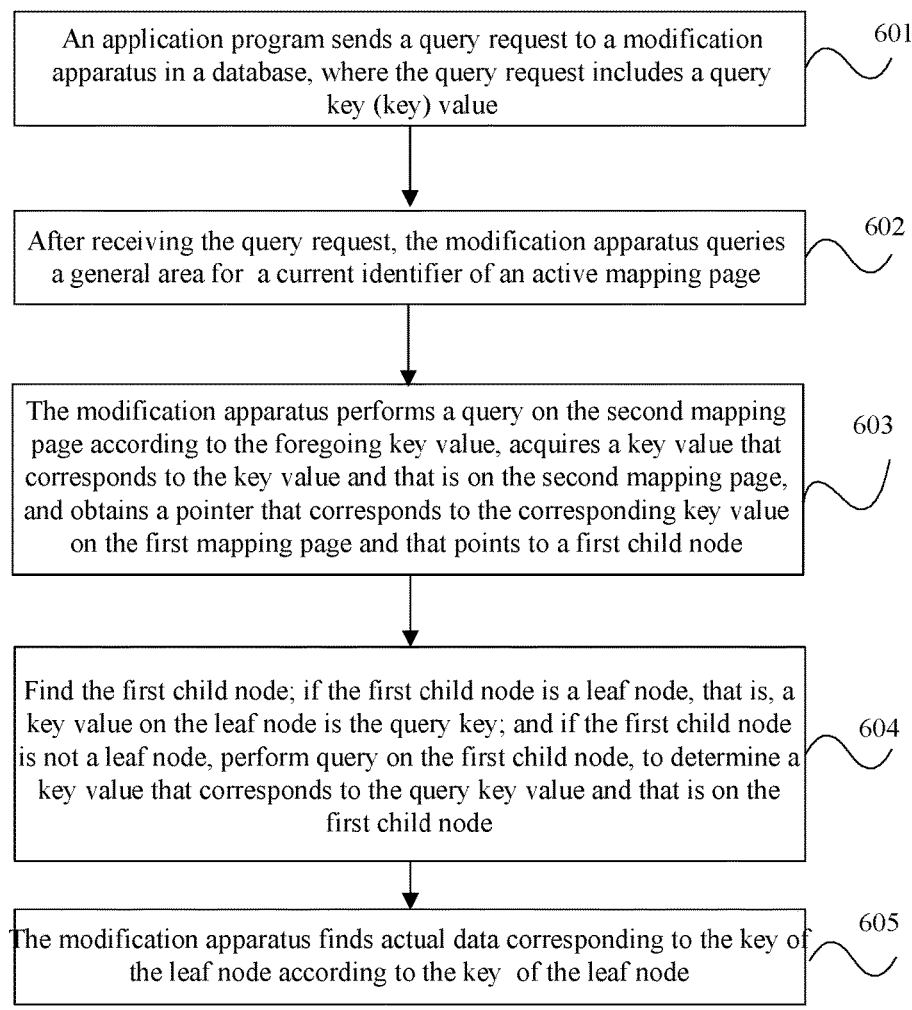
FIG. 6 is a flowchart of a data query method according to an embodiment of the present invention.

FIG. 6 shows a data query method according to the present invention based on the method for modifying a root node in FIG. 4 according to the present invention. The method includes:

Step 601: An application program sends a query request to a modification apparatus in a database, where the query request includes a query key.

Step 602: After receiving the query request, the modification apparatus queries a general area for a current identifier of an active mapping page. For example, the current identifier of the active mapping page is an identifier of a second mapping page, in other words, the current second mapping page is the active mapping page.

Step 603: The modification apparatus performs query on the second mapping page according to the foregoing key, acquires a key that corresponds to the key and that is on the second mapping page, and obtains a pointer that corresponds to the corresponding key on the second mapping page and that points to a first child node.

Certainly, it is also feasible if the pointer is a specific address. In this case, an address that corresponds to the corresponding key on the second mapping page and that points to the first child node may be obtained.

Step 604: Find the first child node according to the pointer that corresponds to the corresponding key on the second mapping page and that points to the first child node; if the first child node is a leaf node, namely, a key on the leaf node is the query key included in the query request, the key on the leaf node is the query key; and if the first child node is not a leaf node, perform query on the first child node, to determine a key that corresponds to the query key and that is on the first child node, and obtain a pointer that corresponds to the corresponding key on the first child node and that points to a second child node. If the second child node is not a leaf node, step 604 is repeated until a found child node is a leaf node.

If the foregoing query request queries data corresponding to the key, step 605 needs to be further executed.

Step 605: The modification apparatus finds actual data corresponding to the key of the leaf node according to the key of the leaf node.

A data query process is described below with reference to the B*tree in FIG. 5. It is assumed that, after a child node having keys of 85 and INF in FIG. 5 has just been newly added, when a root node has not been modified yet or the root node has been modified but a current active mapping page has not been modified correspondingly, the modification apparatus receives a query request having a query key of 80, and performs query on the current active mapping page according to the key 80. Because the current active mapping page has only keys 27, 56, and INF, and content of the active mapping page has not been modified correspondingly currently, a key greater than or equal to 80 found on the root node is INF. As a pointer corresponding to the key INF points to a child node with keys of 65, 70, and 77, the pointer of the child node having the keys of 65, 70, and 77 is acquired. The node having the keys of 65, 70, and 77 is queried according to the pointer of the child node, and it is determined that a greatest key on the node is 77. However, the query key is 80, and it is determined that none of keys of leaf nodes of the child node is 80. Therefore, a next brother node of the node is queried on the node having the keys of 65, 70, and 77, a node having keys of 85 and INF is found by using a pointer of the brother node, and a leaf node having a key of 80 is found on the node with the keys of 85 and INF.

It is assumed that after the child node having the keys of 85 and INF in FIG. 5 is newly added, the current active mapping page has been modified correspondingly. Then, the modification apparatus receives a query request with a query key of 80, and performs query on the current active mapping page according to the key 80. Because the current active mapping page includes keys 27, 56, 77, and INF, a key greater than or equal to 80 found on the root node is INF. A pointer corresponding to the key INF points to a child node having keys of 85 and INF, and a leaf node having a key of 80 is found on the node having the keys of 85 and INF.

An embodiment of the present invention further provides a non-volatile computer readable storage medium, where the non-volatile computer readable storage medium is configured to store computer executable program code, and the program code includes an instruction for executing the method in the embodiment corresponding to FIG. 4 or FIG. 6.

An embodiment of the present invention further provides a computer program, where when being executed by a computer, code in the computer program is used to implement the method in the embodiment corresponding to FIG. 4 or FIG. 6.

In the embodiments of the present invention, a first mapping page and a second mapping page that correspond to a root node are stored in a general area, where one of the mapping pages serves as an active mapping page and is used to handle a data access service. Therefore, after the root node is modified, it is unnecessary to add a lock on the root node, and access is still handled by using the active mapping page. In addition, a non-active mapping page is updated first, and then the non-active mapping page is switched to the active mapping page, so as to implement update of the active mapping page, thereby further implementing that a database can still handle a modification request when handling a query request and improving concurrent processing efficiency of the database.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A modification apparatus, comprising:
   a processor; and
   a non-transitory computer-readable storage medium coupled to the processor and storing programming instructions for execution by the processor, the programming instructions instruct the processor to:
   receive a root node modification request, wherein the root node modification request comprises modification information, the database comprises a data area and a general area, the data area comprises the root node, the general area comprises a first mapping page, an identifier of the first mapping page, a second mapping page, and an identifier of the second mapping page, and both the first mapping page and the second mapping page are mapping pages of the root node;
   modify the root node in the data area of the database according to the modification information;
   replicate the modified root node to the general area of the database;
   find, in the general area of the database, that an identifier of an active mapping page is the identifier of the first mapping page, and determine that the first mapping page is the active mapping page; and
   replace the second mapping page with the modified root node according to the modified root node that is replicated to the general area, and modify the identifier of the active mapping page to the identifier of the second mapping page.

2. The modification apparatus according to claim 1, wherein the programming instructions further comprise instructions which, when executed by the processor, cause the processor to: replace the current first mapping page with the modified root node after the identifier of the active mapping page is modified to the identifier of the second mapping page and after a data query service currently handled by the first mapping page is completed.

3. The modification apparatus according to claim 1, wherein the programming instructions further comprise instructions which, when executed by the processor, cause the processor to: receive a data query request, find that the identifier of the active mapping page is the identifier of the second mapping page, and send the data query request to the second mapping page.

4. The modification apparatus according to claim 1, wherein the programming instructions further comprise instructions which, when executed by the processor, cause the processor to: set an exclusive lock on the root node, remove the exclusive lock on the root node after the root node modification request is received and after the current second mapping page is replaced with the modified root node.

5. A method for modifying a root node, wherein the method comprises:
   receiving a root node modification request, wherein the root node modification request comprises modification information;
   modifying a root node in a data area of a database according to the modification information, wherein the database comprises the data area and a general area, the data area comprises the root node, the general area comprises a first mapping page, an identifier of the first mapping page, a second mapping page, and an identifier of the second mapping page, and both the first mapping page and the second mapping page are mapping pages of the root node;
   replicating the modified root node to the general area of the database;
   finding, in the general area of the database, that an identifier of an active mapping page is the identifier of the first mapping page, and determining that the first mapping page is the active mapping page; and
   replacing the second mapping page with the modified root node according to the modified root node that is replicated to the general area, and modifying the identifier of the active mapping page to the identifier of the second mapping page.

6. The method according to claim 5, wherein after the identifier of the active mapping page is modified to the identifier of the second mapping page and after a data query service currently handled by the first mapping page is completed, the method further comprises: replacing the current first mapping page with the modified root node.

7. The method according to claim 5, further comprising: receiving a data query request, finding that the identifier of the active mapping page is the identifier of the second mapping page, and sending the data query request to the second mapping page, so that the second mapping page handles the data query request.

8. The method according to claim 5, after the receiving a root node modification request, further comprising:

setting an exclusive lock on the root node.

9. The method according to claim 8, after the replacing the current second mapping page with the modified root node, further comprising:

removing the exclusive lock on the root node.

10. A non-volatile computer readable storage medium, wherein the non-volatile computer readable storage medium is configured to store computer executable instructions that, when executed by one or more processors, causes the one or more processors to perform modify a root node by performing the steps of:

receiving a root node modification request, wherein the root node modification request comprises modification information;

modifying a root node in a data area of a database according to the modification information, wherein the database comprises the data area and a general area, the data area comprises the root node, the general area comprises a first mapping page, an identifier of the first mapping page, a second mapping page, and an identifier of the second mapping page, and both the first mapping page and the second mapping page are mapping pages of the root node;

replicating the modified root node to the general area of the database;

finding, in the general area of the database, that an identifier of an active mapping page is the identifier of the first mapping page, and determining that the first mapping page is the active mapping page; and replacing the second mapping page with the modified root node according to the modified root node that is replicated to the general area, and modifying the identifier of the active mapping page to the identifier of the second mapping page.

11. The non-volatile computer readable storage medium according to claim 10, wherein the computer instructions further includes instructions for replacing the current first mapping page with the modified root node after the identifier of the active mapping page is modified to the identifier of the second mapping page and after a data query service currently handled by the first mapping page is completed.

12. The non-volatile computer readable storage medium according to claim 10, wherein the computer instructions further includes instructions for:

receiving a data query request, determining whether the identifier of the active mapping page is the identifier of the second mapping page, and sending the data query request to the second mapping page, so that the second mapping page handles the data query request.

13. The non-volatile computer readable storage medium according to claim 10, wherein the computer instructions further includes instructions for setting an exclusive lock on the root node after the receiving a root node modification request.

14. The non-volatile computer readable storage medium according to claim 13, wherein the computer instructions further includes instructions for after the replacing the current second mapping page with the modified root node.

removing the exclusive lock on the root node.

* * * * *